United States Patent [19]

Scheinberg

[11] 3,812,383

[45] May 21, 1974

[54] HIGH SPEED SIGNAL FOLLOWING CIRCUIT

[75] Inventor: Norman Richard Scheinberg, Westfield, N.J.

[73] Assignee: RCA Corporation, New York, N.Y.

[22] Filed: July 20, 1972

[21] Appl. No.: 273,535

[52] U.S. Cl. ................. 307/228, 307/261, 328/127, 328/151, 328/183

[51] Int. Cl. ............................................ H03k 4/50

[58] Field of Search ........... 307/228, 229, 246, 261, 307/273, 290; 328/127, 128, 132, 150, 151, 181, 182, 183, 184

[56] References Cited

UNITED STATES PATENTS

| | | | |
|---|---|---|---|
| 3,551,697 | 12/1970 | Candy | 307/290 X |
| 3,504,192 | 3/1970 | Stopper | 307/218 X |
| 3,067,342 | 12/1962 | Waller | 307/228 |
| 3,210,558 | 10/1965 | Owen | 307/228 |
| 3,419,736 | 12/1968 | Walsh | 307/246 X |
| 3,621,281 | 11/1971 | Hagen | 328/183 X |

FOREIGN PATENTS OR APPLICATIONS

| | | | |
|---|---|---|---|
| 1,169,542 | 11/1969 | Great Britain | 307/228 |

*Primary Examiner*—John S. Heyman
*Assistant Examiner*—L. N. Anagnos
*Attorney, Agent, or Firm*—Edward J. Norton; Joseph S. Tripoli

[57] ABSTRACT

One main electrode of a first and of a second transistor have a common connection with a constant current sink. An input signal is simultaneously applied to the other main electrode of the first transistor and the control electrode of the second transistor. The output signal is taken from the one main electrode of the second transistor and represents an amplified version of the input signal. When a capacitive energy storage means is connected in circuit with the control electrode of the second transistor, the circuit provides a high speed signal integrating function.

36 Claims, 2 Drawing Figures

HIGH SPEED SIGNAL FOLLOWING CIRCUIT

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates generally to signal following circuits and more specifically to signal following circuits adapted for high speed operation.

Although the invention has broader aspects and applications, one particular area in which the present invention is especially useful is high speed signal integrating circuits and more particularly in high speed integrate and dump circuits for communication systems.

One type of prior art integrating circuit is the simple RC combination. One problem with the simple RC network is that the transfer function contains a constant term which does not become negligible until high frequency operation occurs. Therefore, the simple RC network does not perform well as a signal integrator at the low end of the frequency spectrum.

Another type of signal integrator known in the prior art is the operational amplifier with an integrating capacitor coupled between the input and output terminals. One problem with the operational amplifier integrator is that the capacitor is not referenced to ground and thus complicates the dump circuitry. Another problem with this type of integrator is that it normally cannot handle high input data rates.

In one aspect of the present invention, a high speed integrating circuit is provided wherein the integrating capacitor has one end connected to a point of reference potential and the overall circuit has the ability to handle data rates of 40 megabits and above. The integrator may be arranged to look like a substantially ideal integrator by the adjustment of certain circuit parameters.

In the broader aspects of the present invention, there is provided a first and second transistor each having two main electrodes and a control electrode. One main electrode of the first transistor is connected to the control electrode of the second transistor, while one main electrode of the second transistor is connected to the other main electrode of the first transistor. Means are provided for applying an input signal to the one main electrode of the first transistor and to the control electrode of the second transistor. A substantially constant current sink is connected in circuit with the one main electrode of the second transistor and the other main electrode of the first transistor. Output circuit means are connected for deriving an output signal representing an amplified version of the input signal.

Figure 1:
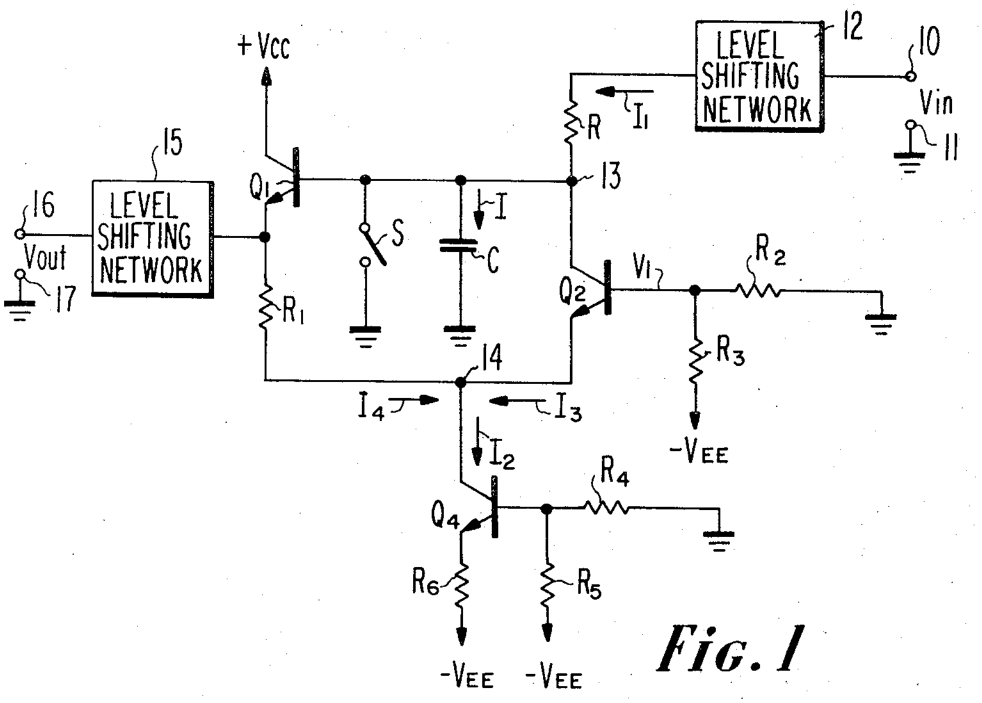
FIG. 1 is a schematic diagram of one embodiment of the present invention.

Referring now to FIG. 1, an output signal which may be carrying digital information at a high data rate from a source (not shown) is applied to input terminals 10 and 11. Terminal 11 is connected to a point of reference potential; namely, ground. Input terminal 10 is connected to a level shifting network 12. The use of level shifting network 12 is optional and will depend upon the particular parameters of the circuit devices and the biasing network used in conjunction therewith. Level shifting network 12 is connected to one end of resistor R.

The other end of resistor R is connected to a junction point 13. Junction point 13 is connected to the base electrode of transistor $Q_1$ and also to the collector electrode of transistor $Q_2$. An integrating capacitor, C, is connected between the base electrode of transistor $Q_1$ and ground potential. In addition, there is also provided a switch S connected in parallel with capacitor C to schematically represent a dump circuit. In FIG. 1, switch S will, of course, discharge capacitor C to ground when the switch is selectively closed.

The base electrode of transistor $Q_2$ is connected to ground potential in one path via resistor $R_2$. The base electrode of transistor $Q_2$ is also connected to a source of biasing potential $-V_{EE}$ via resistor $R_3$. The biasing on transistor $Q_2$ is arranged so that transistor $Q_2$ is operated in its linear region of operation.

The emitter electrode of transistor $Q_2$ is connected to a junction point 14. Another transistor, $Q_4$, has its collector electrode connected to junction point 14. The base electrode of transistor $Q_4$ is connected in one path to ground potential via resistor $R_4$ and to the supply voltage $-V_{EE}$ via resistor $R_5$ in another path. The emitter electrode of transistor $Q_4$ is connected to the supply voltage $-V_{EE}$ via resistor $R_6$. The biasing for transistor $Q_4$ is arranged so as to operate transistor $Q_4$ in its linear region of operation.

It will be recognized, looking at FIG. 1, that transistor $Q_4$ is arranged in the circuit to be a substantially constant current sink. That is, the current flowing through the collector electrode of transistor $Q_4$ will remain substantially constant during the operation of the circuit. The current sink shown in FIG. 1 is one of many arrangements which may be used for this function. For example, a large resistor will also provide the constant current sink function.

The collector electrode of transistor $Q_1$ is connected to a supply voltage $+V_{CC}$. The emitter electrode of transistor $Q_1$ is connected to one end of resistor $R_1$. The other end of resistor $R_1$ is connected to the collector electrode of transistor $Q_4$ via junction point 14.

An output signal is tapped off from the emitter electrode of transistor $Q_1$ and is provided at the input terminal of level shifting network 15. Level shifting network 15 is optional in the overall circuit. In the overall circuit shown in FIG. 1, there will be a level shift from input to output. Hence, networks 12 and 15 may either both be used or a single one may be used to account for the level shift as desired. The other end of level shifting network 15 is connected to the circuit output terminal 16. Circuit output terminal 17 is also provided and is connected directly to ground potential.

In the circuit shown in the Figure, the output voltage will be proportional to the integral of the input voltage and will maintain this relationship for high input data rates as will be more fully explained herein.

From a mathematical approach, the desired output voltage has the form, $$V\text{out} \propto \int V\text{in}\, dt \qquad (1)$$

Now the voltage across a capacitor, $V$cap, is by definition equal to, $$Vcap = 1/C \int I\,dt \quad (2)$$

where $C$ = the capacitance

I = the current charging the capacitor.

If the current $I$ in equation (2) is generated so that, $I = Vin/R$, then equation (2) becomes, $$Vcap = 1/RC \int Vin\,dt \quad (3)$$

Thus, it becomes apparent that the integral of an input voltage, $Vin$, may be obtained by charging a capacitor with a current $I = Vin/R$. This is a known result. However, the generation of a current whose value does not depend upon the voltage across the integrating capacitor but rather only upon the input voltage, $Vin$, is a difficult problem. The embodiment of the invention shown in FIG. 1 displays a way of overcoming the problem.

In order to simplify the following analysis assume that:

a. $V_{BE}$ (Base emitter voltage) for $Q_1$, $Q_2$ and $Q_4 = 0$;

b. Beta is infinite;

c. $R = R_1$; and d. the effect of networks 12 and 15 are neglected.

Now referring back to FIG. 1, the following equations may be written.

$$I_2 = I_4 + I_3 \quad (4)$$

$$I_1 = I + I_3 \quad (5)$$

$$I_1 = (Vin - Vout)/R \quad (6)$$

$$I_4 = (Vout - V_1)/R \quad (7)$$

where $I$ = capacitor charging current $I_1$ = the current through resistor $R$ $I_2$ = the collector current of transistor $Q_4$ $I_3$ = the emitter current of transistoor $Q_2$ $I_4$ = the emitter current of transistor $Q_1$ $V_1$ = the voltage at the base electrode of transistor $Q_2$ referenced to ground potential.

Combining equations (4) – (7) and simplifying yields, $$I = Vin/R + |V_1|/R - I_2 \quad (8)$$

If the values of $V_1$ and $I_2$ are adjusted by selection of resistors $R_2 - R_6$ so that, $$|V_1/R| = I_2 \quad (9)$$

then equation (8) reduces to, $$I = Vin/R, \quad (10)$$

which is the desired relationship to satisfy equation (3), i.e., the current necessary to get a voltage which is the integral of the input voltage.

Another way of analyzing the circuit shown in FIG. 1 is as follows. The transfer function for the circuit is given by, $$\frac{V_{out}}{V_{in}} = \frac{1}{SCR - \left(\frac{R-R_1}{R_1}\right) + \frac{2Rr_e}{R_1^2} + \frac{2R}{R_1 B}} \quad (11)$$

where $B$ = beta of transistors $Q_1$ and $Q_2$ $r_e$ = dynamic resistance of the base-emitter junctions of transistors $Q_1$ and $Q_2$ reflected to the emitters of $Q_1$ and $Q_2$ (Approximately 10 ohms)

If $R$ and $R_1$ are properly chosen so that, $$-(R - R_1/R_1) + 2Rr_e/R_1^2 + 2R/R_1B = 0 \quad (12)$$

then equation (11) will reduct to, $$Vout/Vin = 1/SCR \quad (13)$$

which is the transfer function of an ideal integrator.

If resistors R and $R_1$ are chosen to satisfy equation (12) on the assumption that B is infinite, then the circuit will function somewhat less than ideal. However, it has been observed that for Beta larger than 20, the circuit performs quite well and for Beta of 50 and greater, the circuit is very close to the ideal integrator.

Looking at the circuit in FIG. 1 from a more macroscopic point of view one may observe the following. As the input voltage, Vin, rises, a certain current, fairly large, flows through resistor R and the collector to emitter paths of transistors $Q_2$ and $Q_4$. Also, as the input voltage rises the base electrode of transistor $Q_1$ rises. This causes the current through resistor $R_1$ to rise.

By virtue of the biasing arrangement for transistor $Q_4$, the collector current $I_2$ for transistor $Q_4$ remains substantially constant. Therefore, if the current $I_2$ is constant and the current $I_4$ is rising, the current $I_3$ must decrease. If the current $I_3$ decreases, then there will be more current available to charge the capacitor, that is, the current I is now increasing. Similarly, when the input voltage, Vin, falls, current $I_4$ falls which causes the current $I_3$ to rise and therefore the current I goes down. Hence, the current which charges the capacitor follows the input signal. As it turns out, the circuit in FIG. 1 can handle data rates on the order of 30 – 50 Megabits and higher.

Referring once again to FIG. 1, it will be seen that the inventive concept goes beyond a useful high speed signal integrating circuit. The capacitor could be replaced by some other utilization device, active or passive, and thus provide a circuit wherein a current is provided, the current through resistor $R_1$, which directly follows, in a very sensitive manner, the variations in input signal.

In addition, if no utilization device is interposed to generate a particular function, the circuit will provide a high speed signal following function since very slight signal changes at the base of transistor $Q_1$ (due to changes in input voltage) cause large current changes at the emitter electrode of transistor $Q_1$ which will cause a corresponding change in current through transistor $Q_2$ due to the operation of the constant current sink circuit. Thus, the signal viewed at the emitter electrode of transistor $Q_1$ will be very sensitive to the variations in input voltage.

It should be noted that in particular applications it may be more desirous to take the output signal from some point other than the emitter electrode of transistor $Q_1$ without departing from the spirit of the present invention.

Figure 2:
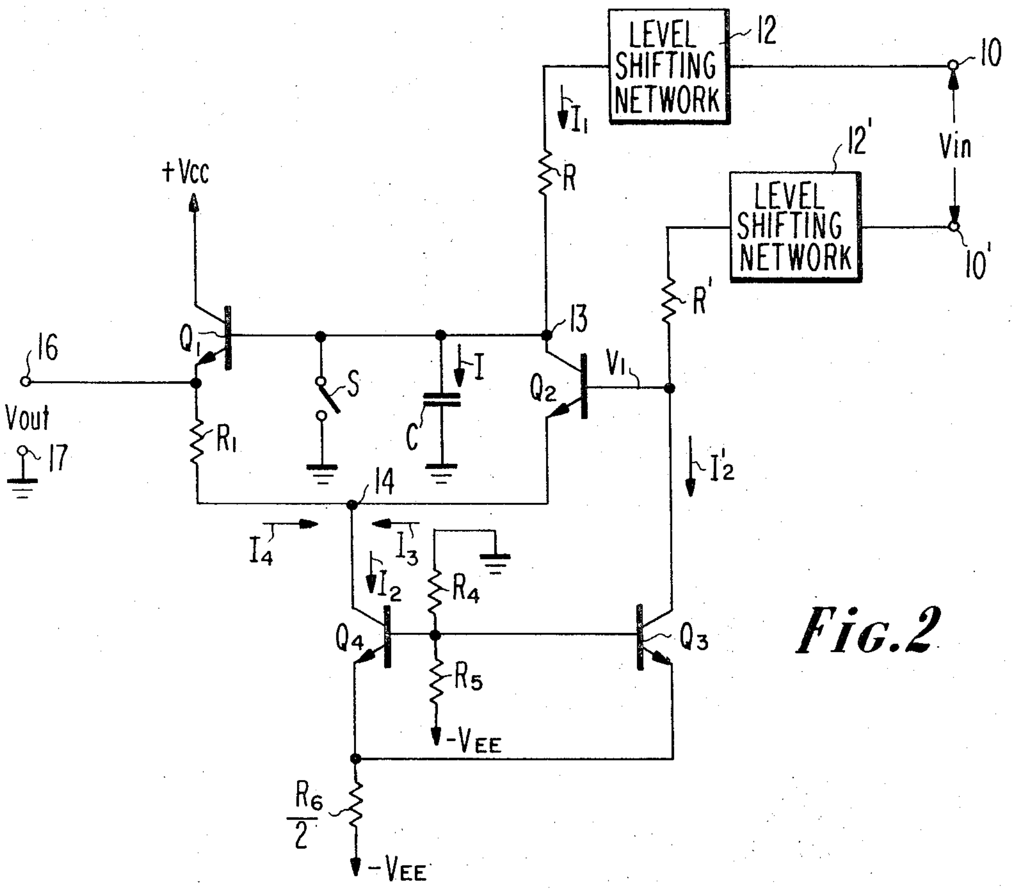
FIG. 2 is a schematic diagram of another embodiment of the invention having a differential input capability.

Referring now to FIG. 2, where elements common to FIG. 1 have the same designations of letters and numerals, a second embodiment of the present invention is shown.

The embodiment shown in FIG. 2 contains different structure for biasing transistor $Q_2$. The biasing structure for transistor $Q_2$ provides temperature compensation for the circuit as well as a differential input capability.

In FIG. 2, the input terminal 10 may now be termed the non-inverting input terminal. A second input terminal 10' is also provided which is the inverting input terminal for the circuit. The input signal Vin is now applied between the input terminals 10 and 10'.

An optional level shifting network 12' is connected to input terminal 10' on one end and a resistor R' on the other end. The other end of resistor R' is connected to the base electrode of transistor $Q_2$. For reasons to be shown the value of resistor R' is made equal to the value of resistor R.

An additional transistor $Q_3$ is provided in FIG. 2 as part of the biasing structure for transistor $Q_2$. The collector electrode of transistor $Q_3$ is connected to the base electrode of transistor $Q_2$. The emitter electrode of transistor $Q_3$ is connected to the emitter electrode of transistor $Q_4$. The base electrode of transistor $Q_3$ is connected to the junction between resistors $R_4$ and $R_5$. The common connection between the emitters of transistors $Q_3$ and $Q_4$ is returned to the voltage supply $-V_{EE}$ through a resistor having a value of $R_6/2$, since the supply $-V_{EE}$ must now provide biasing for both transistors $Q_3$ and $Q_4$ as opposed to only transistor $Q_4$ as shown in FIG. 1.

Transistor $Q_3$ is arranged in a similar fashion to transistor $Q_4$ and does in fact provide the function of a constant current sink as does transistor $Q_4$. The constant collector current provided by transistor $Q_3$ is designated as $I_2'$ in FIG. 2. Transistors $Q_4$ and $Q_3$ are selected to be matched in characteristics and are both operated in the linear region so that the current $I_2$ is substantially equal to the current $I_2'$ independent of input conditions and temperature variations.

The constant current sink function provided by transistor $Q_3$, i.e., the provision of the constant current $I_2'$, cause a voltage drop across resistor R'. The voltage drop across resistor R' establishes the proper voltage level $V_1$ at the base electrode of transistor $Q_2$.

A mathematical analysis may be performed for the circuit of FIG. 2 similar to that for FIG. 1 above. With the basic assumptions previously made, the expression for the current I may be expressed as:

$$I = V\,(\text{non-inverting})/R - V_1/R - I_2 \qquad (14)$$

where $V$ (non-inverting) = the voltage at terminal 10.

The expression for the voltage $V_1$ is given by:

$$V_1 = V\,(\text{inverting}) - I_2'\,R' \qquad (15)$$

where

V (inverting) = the voltage at terminal 10'.

Since $I_2' = I_2$ and $R' = R$ the expression for $V_1$ may be written as:

$$V_1 = V\,(\text{inverting}) - I_2R. \qquad (16)$$

Substituting the expression for $V_1$ from equation (16) into equation (14) yields:

$$I = V\,(\text{non-inverting})/R - [V\,(\text{inverting}) - I_2R]/R - I_2 \qquad (17)$$

Simplifying equation (17) yields $$I = V\,(\text{non-inverting}) - V\,(\text{inverting})/R \qquad (18)$$

Comparing equation (18) with equation (10) shows that the expression for the current in equation (18) is the desired relationship to satisfy equation (3).

The output signal in FIG. 2 taken at terminals 16 and 17 depends on the difference between the signals applied to terminals 10 and 10' and not on the absolute value of the input signal. Such a circuit is said to provide a differential input.

The circuit of FIG. 2 provides temperature compensation in the sense that the current I will not change if the temperature of all the transistors in the circuit changes by an equal amount. This is the case when the transistors are all located on the same integrated circuit.

What is claimed is:

1. A circuit comprising:

first and second transistors each having two main electrodes and a control electrode, one main electrode of the first transistor being connected to the control electrode of the second transistor, one main electrode of the second transistor being connected to the other main electrode of the first transistor;

means for biasing at least said first transistor in its linear region of operation;

means for applying an input signal to said one main electrode of the first transistor and to said control electrode of the second transistor;

a substantially constant current sink means connected in circuit with said one main electrode of the second transistor and said other main electrode of the first transistor; and output circuit means connected in said circuit for deriving an output signal proportionally related to said input signal.

2. The circuit according to claim 1 wherein said substantially constant current sink comprises a third transistor having two main electrodes and a control electrode, one main electrode thereof being connected to the other main electrode of said first transistor and the other main electrode of said third transistor being connected to a point of reference potential.

3. The circuit according to claim 2 further comprising another biasing means for biasing said third transistor in its linear region of operation.

4. A circuit comprising:

first and second transistors each having two main electrodes and a control electrode, one main electrode of the first transistor being connected to the control electrode of the second transistor, one main electrode of the second transistor being connected to the other main electrode of the first transistor;
a passive circuit means connected in circuit with the control electrode of the second transistor and said one main electrode of said first transistor;
means for applying an input signal to said one main electrode of the first transistor and to the control electrode of the second transistor;
a substantially constant current sink connected in circuit with said one main electrode of the second transistor and said other main electrode of the first transistor; and
output circuit means connected in said circuit for deriving an output signal proportionally related to said input signal.

5. The circuit according to claim 4 further comprising a level shifting network connected in circuit with said means for applying an input signal.

6. The circuit according to claim 4 further comprising a level shifting network connected in circuit with said output circuit means.

7. The circuit according to claim 4 further comprising first and second level shifting networks, said first network being connected in circuit with said means for applying an input signal and said second network being connected in circuit with said output circuit means.

8. The circuit according to claim 4 wherein said substantially constant current sink comprises a third transistor having two main electrodes and a control electrode, one main electrode thereof being connected to the other main electrode of said first transistor and the other main electrode thereof being connected to a point of reference potential.

9. The circuit according to claim 8 further comprising biasing means for biasing at least said first and third transistor in their respective linear regions of operation.

10. The circuit comprising:
first and second transistors each having two main electrodes and a control electrode, one main electrode of the first transistor being connected to the control electrode of the second transistor, one main electrode of the second transistor being connected to the other main electrode of the first transistor;
a capacitive energy storage means connected in circuit with the control electrode of the second transistor and said one main electrode of said first transistor;
means for applying an input signal to said one main electrode of the first transistor and to the control electrode of the second transistor;
a substantially constant current sink connected in circuit with said one main electrode of the second transistor and said other main electrode of the first transistor; and
output circuit means connected in circuit with the second transistor for deriving an output signal representing an integrated version of said input signal.

11. The circuit according to claim 10 further comprising a first resistor connected between said means for applying an input signal and the first main electrode of the first transistor.

12. The circuit according to claim 11 further comprising a second resistor connected in circuit with the first main electrode of the second transistor and the other main electrode of the first transistor.

13. The circuit according to claim 11 wherein said substantially constant current sink comprises a third transistor having two main electrodes and a control electrode, one main electrode thereof being connected to the other main electrode of said first transistor and the other main electrode thereof being connected to a point of reference potential.

14. The circuit according to claim 11 further comprising biasing means for biasing at least said first and third transistors in their respective linear regions of operation.

15. The circuit comprising:
first and second transistors of like conductivity types each having a base, an emitter and a collector electrode;
means for connecting the collector electrode of the first transistor to the base electrode of the second transistor;
means including a first resistor for connecting the emitter electrode of the second transistor to the emitter electrode of the first transistor;
means including a second resistor for applying an input signal to the collector electrode of the first transistor and to the base electrode of the second transistor;
a capacitive energy storage means connected between the base electrode of the second transistor and a point of reference potential;
a substantially constant current sink connected in circuit with the emitter electrode of the first transistor; and
output circuit means connected in circuit with the emitter electrode of the second transistor for deriving an output signal which is substantially an integrated version of said input signal.

16. The circuit according to claim 15 wherein said current sink comprises a third transistor having a base, an emitter and a collector electrode, the collector electrode of said third transistor being connected in circuit with the emitter electrode of the first transistor, the emitter electrode of the third transistor being connected to a second point of reference potential.

17. The circuit according to claim 16 wherein said means for applying an input signal includes a level shifting network.

18. The circuit according to claim 16 wherein said output circuit means includes a level shifting network.

19. The circuit according to claim 16 wherein said capacitive energy storage means includes a switching means selectively operable for discharging energy stored in a capacitor.

20. The circuit comprising:
first and second transistors each having two main electrodes and a control electrode, one main electrode of the first transistor being connected to the control electrode of the second transistor, one main electrode of the second transistor being connected to the other main electrode of the first transistor;
means providing a first substantially constant current sink connected in circuit with said one main electrode of the second transistor and said other main electrode of the first transistor;

means providing a second substantially constant current sink connected in circuit with the control electrode of the first transistor;

means for applying an input signal between the control electrode and said one main electrode of said first transistor; and output circuit means connected in said circuit for deriving an output signal proportionally related to said input signal.

21. The circuit according to claim 20 wherein said first current sink comprises:

a third transistor having two main electrodes and a control electrode, one main electrode thereof being connected to the other main electrode of said first transistor and the other main electrode thereof being connected to a point of reference potential; and means for applying a biasing potential to the control electrode of said third transistor.

22. The circuit according to claim 21 wherein said second current sink comprises:

a fourth transistor having two main electrodes and a control electrode, one main electrode thereof being connected to the control electrode of said first transistor, the other main electrode thereof being connected to said point of reference potential; and means for applying a biasing potential to the control electrode of said fourth transistor.

23. The circuit comprising:

first and second transistors each having two main electrodes and a control electrode, one main electrode of the first transistor being connected to the control electrode of the second transistor, one main electrode of the second transistor being connected to the other main electrode of the first transistor;

a passive circuit means connected in circuit with the control electrode of said second transistor and said one main electrode of said first transistor;

means providing a first substantially constant current sink connected in circuit with said one main electrode of the second transistor and said other main electrode of the first transistor;

means providing a second substantially constant current sink connected in circuit with the control electrode of the first transistor;

means for applying an input signal between the control electrode and said one main electrode of said first transistor; and output circuit means connected in said circuit for deriving an output signal proportionally related to said input signal.

24. The circuit according to claim 23 wherein said first current sink comprises:

a third transistor having two main electrodes and a control electrode, one main electrode thereof being connected to the other main electrode of said first transistor and the other main electrode thereof being connected to a point of reference potential; and means for applying a biasing potential to the control electrode of said third transistor, for biasing said third transistor in the linear region of operation.

25. The circuit according to claim 24 wherein said second current sink comprises:

a fourth transistor having two main electrodes and a control electrode, one main electrode thereof being connected to the control electrode of said first transistor, the other main electrode thereof being connected to said point of reference potential; and means for applying a biasing potential to the control electrode of said fourth transistor, for biasing the fourth transistor in the linear region of operation.

26. The circuit according to claim 25 further comprising first and second level shifting networks connected in circuit with the control electrode and said one main electrode of said first transistor respectively.

27. The circuit comprising:

first and second transistors each having two main electrodes and a control electrode, one main electrode of the first transistor being connected to the control electrode of the second transistor, one main electrode of the second transistor being connected to the other main electrode of the first transistor;

a capacitive energy storage means connected in circuit with the control electrode of the second transistor and said one main electrode of said first transistor;

means providing a first substantially constant current sink connected in circuit with said one main electrode of the second transistor and said other main electrode of the first transistor;

means providing a second substantially constant current sink connected in circuit with the control electrode of the first transistor;

means for applying an input signal between the control electrode and said one main electrode of said first transistor; and output circuit means connected in circuit with said second transistor for deriving an output signal representing an integrated version of said input signal.

28. The circuit according to claim 27 wherein said first current sink comprises:

a third transistor having two main electrodes and a control electrode, one main electrode thereof being connected to the other main electrode of said first transistor and the other main electrode thereof being connected to a point of reference potential; and means for applying a biasing potential to the control electrode of said third transistor.

29. The circuit according to claim 28 wherein said second current sink comprises:

a fourth transistor having two main electrodes and a control electrode, one main electrode thereof being connected to the control electrode of said first transistor, the other main electrode thereof being connected to said point of reference potential; and means for applying a biasing potential to the control electrode of said fourth transistor.

30. The circuit according to claim 29 wherein said capacitive energy storage means includes a switching means connected in parallel with a capacitor.

31. The circuit according to claim 30 further comprising first and second resistors connected in circuit with the control electrode and said one main electrode of said first transistor respectively.

32. The circuit according to claim 31 further comprising first and second level shifting networks connected in circuit with said first and second resistors respectively.

33. The circuit comprising:

first and second transistors of like conductivity type, each having a base, an emitter and a collector electrode;

means for connecting the collector electrode of the first transistor to the base electrode of the second transistor;

first and second input terminals adapted for connection to a source of input signal;

means including a first resistor for connecting the first input terminal to the collector electrode of the first transistor.

means including a second resistor for connecting the second input terminal to the base electrode of the first transistor;

means including a third resistor for connecting the emitter electrode of the second transistor to the emitter electrode of the first transistor;

a capacitive energy storage means connected between the base electrode of the second transistor and a point of reference potential;

a first substantially constant current sink connected in circuit with the emitter electrode of the first transistor;

a second substantially constant current sink connected in circuit with the base electrode of said first transistor; and output circuit means connected in circuit with the emitter electrode of said second transistor for deriving an output signal which is substantially an integrated version of said input signal.

34. The circuit according to claim 33 wherein said first current sink comprises:

a third transistor having two main electrodes and a control electrode, one main electrode thereof being connected to the emitter electrode of said first transistor and the other main electrode thereof being connected to another point of reference potential; and means for applying a biasing potential to the control electrode of said third transistor.

35. The circuit according to claim 34 wherein said second current sink comprises:

a fourth transistor having two main electrodes and a control electrode, one main electrode thereof being connected to the control electrode of said first transistor, the other main electrode thereof being connected to said other point of reference potential; and means for applying a biasing potential to the control electrode of said fourth transistor.

36. The circuit according to claim 35 wherein said capacitive energy storage means includes a switch in parallel with a capacitor.

* * * * *